Nov. 20, 1951 H. W. AUGUSTADT 2,575,990

AUTOMATIC VOLUME CONTROL

Filed Dec. 31, 1949 2 SHEETS—SHEET 1

INVENTOR
H. W. AUGUSTADT
BY D. MacKenzie
AGENT

Nov. 20, 1951

H. W. AUGUSTADT 2,575,990

AUTOMATIC VOLUME CONTROL

Filed Dec. 31, 1949

2 SHEETS—SHEET 2

INVENTOR
H. W. AUGUSTADT
BY
D. MacKenzie
AGENT

Patented Nov. 20, 1951

2,575,990

UNITED STATES PATENT OFFICE 2,575,990

AUTOMATIC VOLUME CONTROL

Herbert W. Augustadt, Westfield, N. J., assignor to Bell Telephone Laboratories, Incorporated, New York, N. Y., a corporation of New York Application December 31, 1949, Serial No. 136,337

4 Claims. (Cl. 179—1)

This invention relates to an improved automatic volume control system adapted to control the level of a sound program reproduced in the presence of noise in a listening area. The invention contemplates the reproduction, in a noisy location, of program selections with intervening intervals of no program and provides means for controlling in each program period the gain of the sound reproducing system in accordance with the noise level of the preceding interval of no program.

The volume control system herein disclosed is therefore referred to as an "interval adjusting" system and its operation serves to set the reproducing gain during a no-program interval at such a value that the next ensuing program shall be reproduced at a sound level high enough to be pleasantly audible with respect to the noise level, if the noise continues at the same level during the program as prior to the beginning thereof. Provision is also made for disabling the volume control from making further changes in reproducing gain during the rendition of a program selection. The program to be reproduced may be directly picked up by a microphone, received by radio, or derived from a sound record on disc or photographic film.

A general object of the invention is to provide a method and system of apparatus enabling a sound program to be presented in a listening area at a level sufficiently high to be pleasantly audible in the presence of noise.

The system of apparatus to be described is wholly electrical requiring no mechanical or electromechanical elements, and the provision of a wholly electrical system for the purpose stated is also an object of the invention.

In my copending application, Automatic Volume Control, filed September 17, 1949, Serial No. 116,397, the general method of interval-adjusting gain control is disclosed and claimed in connection with an electromechanical system for the same purpose. That application is assigned to the same assignee as the present invention.

A further object is to provide a volume control system controlling the level of sound reproduction in accordance with the level of noise in the interval preceding the reproduction.

Another object is to provide, in such a volume control system, means for disabling the volume control system from making further level changes after sound reproduction begins and to re-establish the volume control system when the sound reproduction ends.

In effecting the control of sound level to enable a program to be audible above the ambient noise in the listening area, it is not required that the level difference between program and noise have always a prescribed value. Such a requirement would lead in some cases to excessively high program levels which would be objectionable if a sudden drop in noise level took place.

A feature of the invention is a design arrangement whereby a relatively large range in ambient noise levels produces a much smaller range of program level changes under its control.

In the prior art there are disclosures of continuously adjusting volume control systems which cause the program level to rise and fall with similar changes in ambient noise, throughout the rendition of the program. Such a system is shown, for example, in United States Patent 2,338,551, January 4, 1944, to E. Stanko. While continuously adjusting systems are useful, they have the disadvantage that where frequent and substantial changes in noise level occur during the program, the consequent changes in program level may spoil the artistic character of the reproduction. The avoidance of this effect is another object of the present invention, which allows the program channel gain to vary continuously with noise level during an interval between program selections but interrupts this controlled variation throughout the rendition of a selection, leaving it at the value established by the preceding noise level.

For a full understanding of the invention the reader is referred to the following description of a preferred embodiment thereof, with the accompanying drawings, in which.

Figure 1:
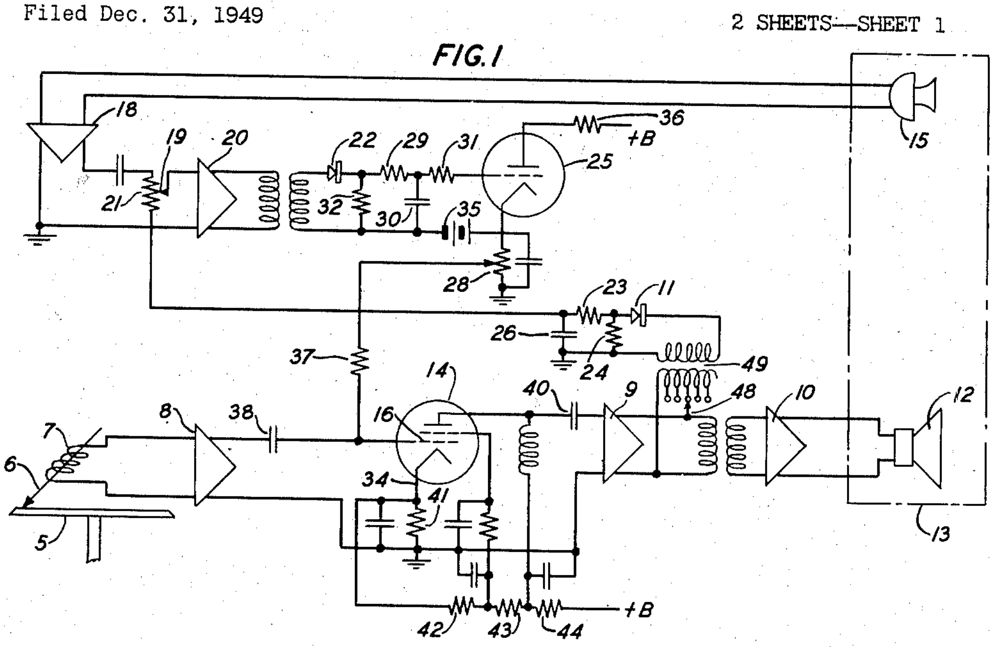
Fig. 1 is a schematic diagram of the circuit of the invention.

Referring now to Fig. 1, 5 is a phonograph disc driven by a motor not shown and its sound record is translated into voltage variations by an electro-mechanical reproducer symbolized by stylus 6 and coil 7. The variations in reproducer output voltage are amplified by the customary amplifier stages 8, 9 and 10 of a standard sound system, feeding speaker array 12 in a listening area 13. A variable gain stage 14 may be introduced in the amplifier string at some relatively low level point, as between amplifiers 8 and 9.

A microphone 15, also situated in the listening area 13, feeds amplifier 18 followed by amplifier 20. Output of amplifier 20, consisting of the amplified electrical output of microphone 15, is rectified by rectifier 22 and via a cathode follower stage including tube 25 connects to variable gain stage 14. Part of the output voltage of amplifier 9 is rectified by rectifier 11 and the rectified voltage is applied to amplifier 20 in the microphone channel through tap 19 on potentiometer 21. The grid leak of amplifier 20 includes the portion of potentiometer 21 below tap 19 in series with resistors 23 and 24.

During an interval between program renditions, microphone 15, amplifiers 18 and 20 and rectifier 22 charge condenser 30 through resistor 29 and apply through resistor 31 to the grid of tube 25 a unidirectional voltage proportional to the average noise level in listening area 13. Tube 25 is an isolating amplifier and provides across its cathode 28 a voltage proportional to that supplied to its grid. A suitable fraction of this cathode voltage is supplied to grid 16 of tube 14 to control the gain of the program channel. When a new program begins a preadjusted fraction of the output voltage of amplifier 9 is rectified by rectifier 11, the output of which is a negative voltage which need be only roughly proportional to the program power. This voltage charges condenser 26 through resistor 23, which have a very short charging time constant (1 second, say) so that amplifier 20 is quickly cut off by the negative voltage of condenser 26. The fractional voltage is made great enough for this purpose.

At the end of a program, condenser 26 discharges through resistors 23 and 24 in series and the discharging time constant need not be less than 15 seconds. The disappearance of the negative disabling voltage enables amplifier 20 to recover and charge anew condenser 30, which is continually discharging through resistors 29 and 32.

The charging current to condenser 30 is limited by resistor 29, which is chosen of high enough resistance (750,000 ohms, say) to smooth out fluctuations in the microphone output. Suitably, condenser 30 is of 40 microfarads capacity and resistor 32 is of 7.2 megohms resistance. The discharge time constant is thus about 320 seconds, so that during a program rendition when amplifier 20 is incapacitated to continue charging condenser 30 the voltage thereon shall not sensibly decrease during the few minutes duration of the usual program selection. The charging time constant of condenser 30 and resistor 29 is about 30 seconds.

Thus, the microphone channel is quickly disabled when a program begins and more slowly recovers at the end of the program. Because of the rather long time constant for discharge of condenser 30, the voltage on this condenser built up during the interval preceding the program continues the control of the program gain as will now be described.

The gain required in the program channel from record 5 to loudspeaker 12 may be, in the average installation, 100 decibels. Since the output of the microphone is of the same order of magnitude as that of the disc record reproducer, about 100-decibel gain is needed also in the microphone channel.

Figure 2:
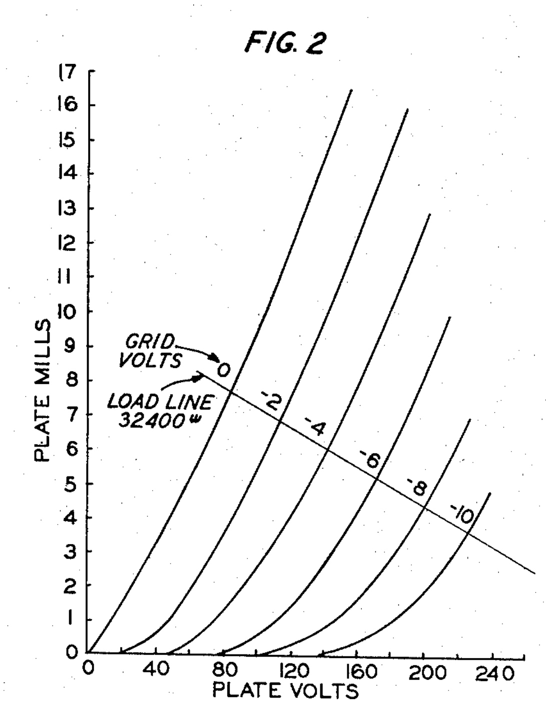
Fig. 2 shows $e_p$—$i_p$ curves and load line for tube 25 of Fig. 1.

The voltage developed on condenser 30 is applied to the grid circuit of tube 25, directly between cathode and grid, a negative bias being supplied by battery 35, the polarity of the condenser voltage being opposed to this. Battery 35 may consist of Mallory grid battery cells or equivalent, and may bias the grid 10 volts negative with respect to the cathode when there is no voltage on condenser 30. Condenser voltage may cover a range of 0 to 10 volts. Thus, when the condenser voltage is 10, effective grid to cathode bias is 0. Tube 25 may conveniently be a 6C5 for which the $i_p$—$e_p$ curves are shown in Fig. 2. At zero effective bias 8 mils is a permanently safe anode current supplied through a suitable resistance from a voltage of +350 volts. Fig. 2 shows a load line corresponding to a direct-current resistance of 32,400 ohms. Part of this is used in cathode resistor 28. Using 2235 ohms (with 30,165 ohms for resistor 36) for the change in cathode drop of exactly 10 volts when condenser voltage is changed over its working range of 10 volts, the arrangement gives a nearly linear relationship between the variation in voltage of condenser 30 and the variation in voltage drop across resistor 28.

Of course, the full voltages developed across resistor 28 for the corresponding extremes (0 to 10 volts) of voltage on condenser 30 are respectively 7.87 volts and 17.87 volts, the difference between them being 10 volts. It will presently be shown desirable to furnish to a variable $\mu$ tube grid biases of from —3 to —6.63 volts, representing a range of variation of 3.63 volts. This is 36.3 per cent of the 10 volts variation available on resistor 28. If this resistor is tapped at the 36.3 per cent point, the extreme voltages will be 2.85 and 6.48, whose difference is 3.63 volts, the desired range. These voltages are positive to ground.

Figure 3:
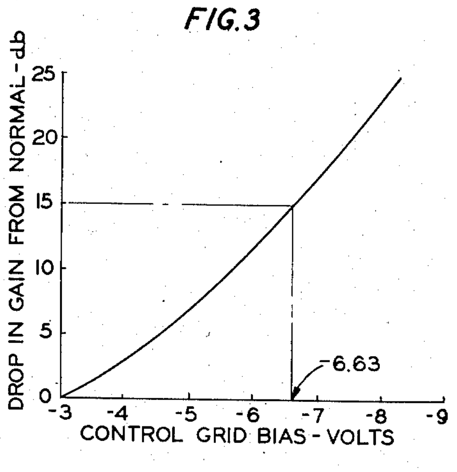
Fig. 3 shows the decrease in gain with increase in negative control bias for variable $\mu$ tube 14 of Fig. 1.

The tap from resistor 28 is connected by resistor 37, which may be one-half to 1 megohm, to grid 16 of tube 14. Tube 14 may be a 6SJ7, and may operate at 250 volts on the plate, 100 volts on the screen, a normal maximum gain operating condition of —3 volts grid bias. From the characteristics of this tube one obtains a curve shown such as shown in Fig. 3, which shows that for a reduction of 15 decibels in gain below the desired maximum value there is needed a control bias of 6.63 volts.

Rectifier 22 may be reversed and resistor 37 connected to cathode 34 of tube 14, with choice of appropriate values for the intervening circuit elements. This enables the invention to use a negative, instead of a positive, noise voltage.

The 15-decibel gain change, above, is adopted because it is desired to connect tube 14 and its associated network as a variable $\mu$ stage between existing resistance-coupled stages of a program channel in service otherwise as a non-adjusting system. Thus, condenser 38 may be the coupling condenser of the existing channel amplifier, and in Fig. 1 the added parts are tube 14 and condenser 40, and the associated wiring shown, amplifiers 9 and 10 being the remaining higher level stages of the program channel.

Figure 4:
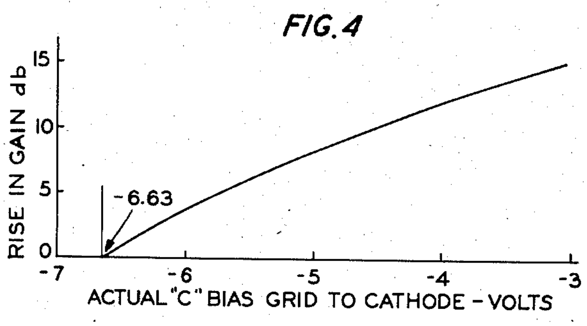
Fig. 4 shows rise in gain versus grid-to-cathode voltage on tube 14 of Fig. 1 in the range of interest in this invention.

For tube 14 we wish to maintain grid 16 6.63 volts negative with respect to cathode 34 when there is no call for added amplification. This, as seen from the curve of Fig. 3, gives a gain 15 decibels below the maximum we wish to work at. Thus we can consider this reference gain and replot the curve as rise in gain above reference as a function of grid to cathode bias, which is shown in Fig. 4.

The 6.63 volts above referred to, then, is the control grid to cathode voltage of tube 14 for reference gain as defined. Whereas the control voltage coming down to grid 16 through resistor 37 varies over a range of 3.63 volts, the absolute values are 2.85 and 6.48 volts respectively. Hence the 2.85 volts we shall wish to subtract out, and this is readily done by biasing cathode 34 positive with respect to ground by that amount by means of a plate supply bleeder tap.

Resistor 41 is the cathode to ground portion of the bleeder, which will have to supply 6.63+2.85=9.48 volts of fixed bias. Assuming 50 mil bleeder current and 3.8 mils total drain for the tube, the resistance of resistor 40 becomes 9.48÷.0538=176 ohms. This same bleeder may furnish screen and plate voltage to tube 14. This requires 1812 ohms for 42, 2950 ohms for 43, and 1856 ohms for 44, the supply voltage being 350 volts, as before.

Cathode 34 of tube 14 is therefore held at +9.48 volts with respect to ground at all times, so that voltages of +2.85 to +6.48 applied to grid 16 with respect to ground will yield grid to cathode voltages of −6.63 to −3.0, as required by Fig. 3 to produce the desired gain change of 15 decibels as a rise above reference gain. This amounts to a positive control voltage of 0 to 3.63 volts being injected over and above reference gain conditions, as depicted in the curve of Fig. 5.

Figure 6:
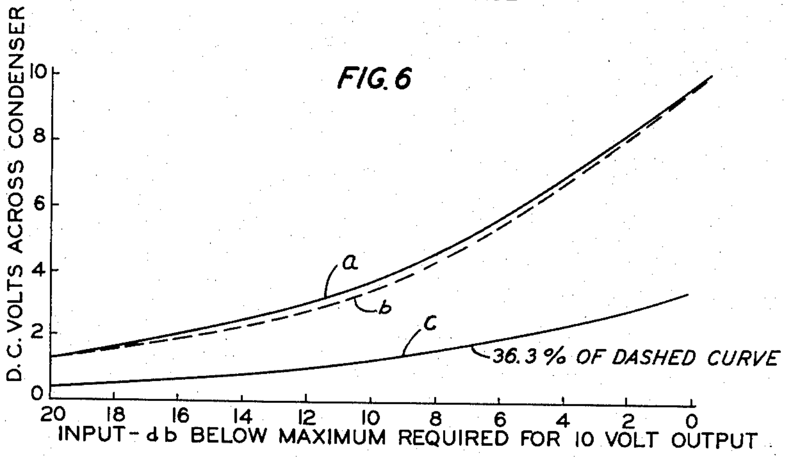
Fig. 6 shows the rectification characteristics and the proportion of voltage available for gain control.

Fig. 6 shows three curves, *a* being the direct-current volts across condenser 30 for various values of noise ranging from 0 decibel, assigned to the noise input giving 10 volts on condenser 30, down to an input 20 decibels below that value. Curve *b* shows a similar relationship for the voltage difference appearing across all of resistor 28. Curve *c* shows the relationship for the portion of the resistor between the 36.3 per cent tap and ground, and again relates difference voltage to decibel noise change.

Figure 5:
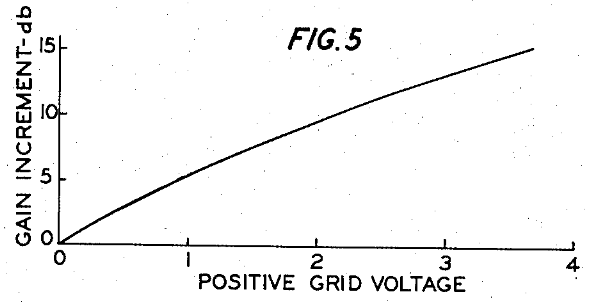
Fig. 5 shows gain increment versus positive control voltage from cathode follower tube 25.
Figure 7:
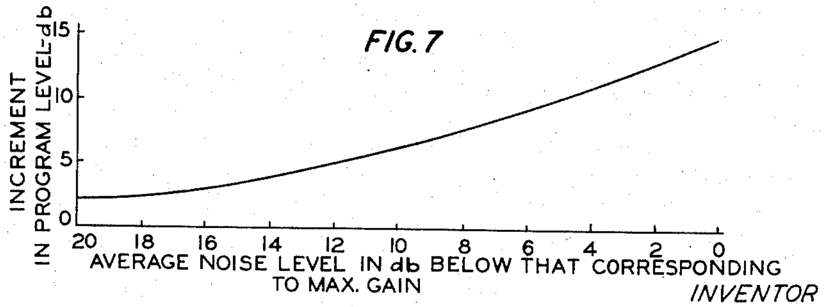
Fig. 7 shows the overall performance characteristic.

Combining information of Figs. 5 and 6 furnishes Fig. 7, which demonstrates overall performance. As is shown, a drop in noise of 20 decibels does not completely drop the program level down to that corresponding to reference gain. At the rate the curve is falling it will take at least another 10 decibels to reach reference value, so that an overall range of 30 decibels in noise change gives a program level change of only 15 decibels, which is desired.

In practice the microphone channel would be lined up by setting its gain so that the absolute maximum of noise experienced at peak load times gives no more than a 10-volt charge on the condenser. No other adjustments are necessary other than to set the program channel gain during as complete an absence of noise as possible to such a level as to constitute a thoroughly pleasing rendition of the program.

In the microphone channel high quality is not essential, so that a permanent magnet loudspeaker and transformers of high ratio may be used. Amplifiers 18 and 20 may each use a 6SH7 tube. Tap 48 on the primary winding of transformer 49 provides universality in connecting the microphone channel to any existing program channel. Condenser 26 may be 8 microfarads, resistors 23 and 24 may be 100,000 ohms and 2 megohms, respectively. A decoupling filter, not shown, is properly used in the anode voltage supply to decouple the anodes of tubes 14 and 25. Rectifiers 11 and 22 may each be made of twenty three-sixteenth inch copper oxide varistor pellets. Power supplies, not shown, are understood for cathode heating and plate voltages.

The invention thus provides a simple apparatus for the automatic control of the level of sound reproduced in a noisy room without making use of any mechanical elements at all. During an interval preceding a program rendition, the microphone channel charges a condenser to a unidirectional voltage representing a smoothed average of the noise level in the listening area and this voltage is applied to vary accordingly the gain of a variable $\mu$ tube in the program channel. When a new sound program begins, the program power quickly charges another condenser to a unidirectional voltage applied to disable the microphone channel from making further gain change and the gain of the program channel is maintained, by the long discharge time constant of the noise channel condenser, at the value corresponding to the noise level in the program interval. On the cessation of the program the microphone channel is soon allowed to resume control of gain in the program channel.

Other apparatus arrangements than the one specifically described may be made to serve the purpose of this invention without departing from the spirit thereof. For example, the program gain may be set at a desired maximum corresponding to the highest expected noise level and the noise representative voltage may be applied to reduce this gain with lower noise levels, again adding means for disabling the noise channel during a program rendition and permitting its reactivation at the end of a program.

The general method of interval-adjusting gain control is disclosed and claimed in my copending application, Automatic Volume Control, filed September 17, 1949, assigned to the same assignee as the present invention; the apparatus therein described is an electro-mechanical system.

What is claimed is:

1. Means for automatically controlling the gain of an electrical sound program reproducing system in accordance with the level of disturbing noise during an interval of no sound reproduction, said system including a variable gain thermionic vacuum tube, comprising noise pick-up means, an amplifying channel for deriving from the pick-up means a positive rectified voltage proportional to the noise level, a second thermionic vacuum tube having at least a cathode, a control grid and an anode, the control grid being normally biased negative to the cathode and the cathode being grounded through a resistance, means for applying the rectified voltage to the control grid oppositely to the bias thereon to vary the conductivity of the second tube and therewith the voltage drop across the resistance proportionally to variation in the noise level, means for applying a selected fraction of the voltage drop to vary the gain of the first-named tube in the same sense as the variation in noise level and means controlled by the system for disabling the amplifying channel during the reproduction of sound by the system.

2. Automatic gain-controlling means as in claim 1 wherein the first-named applying means comprises a condenser positively charged by the rectified voltage in a circuit having charge and discharge time constants of the order of 30 and 300 seconds, respectively.

3. Automatic gain-controlling means as in claim 2 wherein the disabling means comprises means for providing a negative rectified voltage proportional to the program power during a program reproduction, a second condenser charged by the negative voltage in a circuit having charge and discharge time constants of the order of 5 and 15 seconds, respectively, and means for applying the voltage of the second condenser to disable the amplifying channel.

4. Automatic gain-controlling means as in claim 1 wherein the variation in decibels of the variable gain thermionic tube is limited to approximately half the variation in decibels of the noise level.

HERBERT W. AUGUSTADT.

REFERENCES CITED

The following references are of record in the file of this patent:

UNITED STATES PATENTS

| Number | Name | Date |
|---|---|---|
| 2,462,532 | Morris | Feb. 22, 1949 |
| 2,466,216 | Ekstrand | Apr. 5, 1949 |
| 2,501,327 | Good | Mar. 21, 1950 |
| 2,503,391 | Kannenberg | Apr. 11, 1950 |